(12) United States Patent
Nishimura et al.

(10) Patent No.: US 11,155,308 B2
(45) Date of Patent: Oct. 26, 2021

(54) VEHICLE SIDE BODY STRUCTURE

(71) Applicant: Mazda Motor Corporation, Hiroshima (JP)

(72) Inventors: Yoshikazu Nishimura, Hiroshima (JP); Takeshi Nakamura, Hiroshima (JP); Daisuke Kiyoshita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/812,686

(22) Filed: Mar. 9, 2020

(65) Prior Publication Data

US 2020/0317273 A1    Oct. 8, 2020

(30) Foreign Application Priority Data

Apr. 4, 2019    (JP) .............................. JP2019-071816

(51) Int. Cl.
*B62D 25/04* (2006.01)
*B62D 25/02* (2006.01)
*B62D 27/02* (2006.01)

(52) U.S. Cl.
CPC ........... *B62D 25/04* (2013.01); *B62D 25/025* (2013.01); *B62D 27/023* (2013.01)

(58) Field of Classification Search
CPC ....... B62D 25/04; B62D 25/02; B62D 27/023
USPC ...... 296/193.06, 203.01, 203.03, 203.04, 29, 296/30
See application file for complete search history.

(56) References Cited

U.S. PATENT DOCUMENTS

| | | | | |
|---|---|---|---|---|
| 8,226,157 B2* | 7/2012 | Mackenzie | ............ | B62D 25/04 296/193.06 |
| 9,187,132 B2* | 11/2015 | Arikai | .................... | B62D 25/04 |
| 2013/0278017 A1* | 10/2013 | Arikai | .................... | B62D 25/04 296/193.06 |
| 2013/0278022 A1* | 10/2013 | Arikai | .................... | B62D 25/04 296/202 |

FOREIGN PATENT DOCUMENTS

JP    2012116408 A    6/2012

* cited by examiner

*Primary Examiner* — Dennis H Pedder
(74) *Attorney, Agent, or Firm* — Alleman Hall Creasman & Tuttle LLP (57) ABSTRACT

To provide a vehicle side body structure capable of securing vibration suppression performance while suppressing an increase in body weight by a connecting member that connects an outer reinforcement and an inner reinforcement. The present invention includes: a rear wheel house configured to include a wheel house outer and a wheel house inner; an outer reinforcement cooperating with the wheel house outer to define a first closed cross section that extends in a vertical direction and is provided along a part of a rear door opening edge; and an inner reinforcement cooperating with the wheel house inner to define a second closed cross section that extends in the vertical direction. A connecting member is provided to fix a striker to the outer reinforcement and connect a front flange of the outer reinforcement and each of a front wall and a front flange of the inner reinforcement.

18 Claims, 8 Drawing Sheets

VEHICLE SIDE BODY STRUCTURE

TECHNICAL FIELD

The present invention relates to a vehicle side body structure.

BACKGROUND ART

Conventionally, a rear wheel house configured to include a rear wheel house outer and a rear wheel house inner has been known. The rear wheel house outer includes: an outer overhang that overhangs outward in a vehicle width direction; and an outer flange that extends upward from an inner end in the vehicle width direction of this outer overhang. The rear wheel house inner includes: an inner overhang that overhangs inward in the vehicle width direction; and an inner flange that extends upward from an inner end in the vehicle width direction of this inner overhang and is joined to the outer flange.

The rear wheel house receives a travel load via a damper support section of a rear suspension, which causes deformation of a portion around a rear door opening edge and generates body vibrations.

To handle such a problem, in order to improve body rigidity, the rear wheel house outer is provided with a pillar outer member (a pillar outer reinforcement) that cooperates with this rear wheel house outer to define a closed cross section extending in a vertical direction, and the rear wheel house inner is provided with a pillar inner member that cooperates with this rear wheel house inner to define a closed cross section extending in a body vertical direction.

A body structure in Patent document 1 is provided with: the rear wheel house configured to include the rear wheel house outer and the rear wheel house inner; the pillar outer member that cooperates with this rear wheel house outer to define the closed cross section extending in the vertical direction; the pillar inner member that cooperates with the rear wheel house inner to define the closed cross section extending in the body vertical direction; and a reinforcing member that cooperates with the rear wheel house outer and the pillar outer member to define the closed cross section. A rear door striker is attached to this reinforcing member.

PRIOR ART DOCUMENTS

Patent Documents

Patent document 1: JP 2012-116408A

SUMMARY OF THE INVENTION

Problem to be Solved by the Invention

In the body structure in Patent document 1, the reinforcing member couples the rear wheel house outer and the pillar outer member to define the closed cross section, and the body vibrations are thereby suppressed.

However, in a technique disclosed in Patent document 1, as a dedicated striker fixing member, the reinforcing member is provided in addition to the pillar outer member. Thus, the number of components is increased, which possibly increases body weight.

In addition, in Patent document 1, in addition to the travel load received by the rear wheel house, an opening/closing load of the rear door received by the rear door striker is concentrated on the pillar outer member, and these loads are transmitted only to a roof-side outer member that constitutes a load path. Thus, there is also a possibility that expected vibration suppression performance cannot be secured.

It is considered to improve rigidity by increasing a plate thickness of the pillar outer member and thereby suppress the body vibrations caused by the concentration of the loads such as the travel load and the opening/closing load.

However, the increase in the plate thickness possibly leads to a weight increase. That is, it is not easy to secure the vibration suppression performance while suppressing an increase in the body weight.

An object of the present invention is to provide a vehicle side body structure and the like capable of securing vibration suppression performance while suppressing an increase in body weight.

Means for Solving the Problem

A vehicle side body structure according to a first aspect includes: a rear wheel house configured to include a rear wheel house outer and a rear wheel house inner; a pillar outer member cooperating with the rear wheel house outer to define a first closed cross section that extends in a vertical direction and is provided along a part of a rear door opening edge; and a pillar inner member cooperating with the rear wheel house inner to define a second closed cross section that extends in a body vertical direction. In the vehicle side body structure, a connecting member is provided to fix a rear door striker to the pillar outer member and connect an inner portion in a vehicle width direction of the pillar outer member and an outer portion in the vehicle width direction of the pillar inner member.

In this vehicle side body structure, since the connecting member is provided to connect the inner portion in the vehicle width direction of the pillar outer member and the outer portion in the vehicle width direction of the pillar inner member, it is possible to disperse an opening/closing load of a rear door, which is input via the rear door striker, to a body frame member via the pillar outer member and the pillar inner member as two load paths. In addition, since the rear door striker is fixed to the pillar outer member, a dedicated striker fixing member for fixing the rear door striker can be omitted, and thus, weight can be reduced.

In the invention according to the first aspect, the invention according to a second aspect is characterized in that the connecting member is connected to each of the pillar outer member, the pillar inner member provided along the part of the rear door opening edge, the rear wheel house outer, and the rear wheel house inner.

With this configuration, it is possible to strengthen support rigidity of the connecting member.

In the invention according to the first or second aspect, the invention according to a third aspect is characterized in that the connecting member includes: a side wall that is substantially orthogonal to the vehicle width direction; a horizontal wall that is substantially orthogonal to the body vertical direction; and a vertical wall that is substantially orthogonal to a body front-rear direction.

With this configuration, it is possible to improve dispersion efficiency of the opening/closing load of the rear door by using the single connecting member.

In the invention according to any one of the first to third aspects, the invention according to a fourth aspect is characterized that the connecting member is arranged at a position adjacent to the rear door striker.

With this configuration, it is possible to increase the opening/closing load of the rear door that is transferred to the pillar inner member.

In the invention according to the fourth aspect, the invention according to a fifth aspect is characterized that a height position of a fixture section that fixes the rear door striker to the pillar outer member is set at substantially the same height as a height position of a joint section for the connecting member and the rear wheel house outer.

With this configuration, it is possible to minimize size of the connecting member and thus reduce weight thereof.

In the invention according to any one of the first to fifth aspects, the invention according to a sixth aspect is characterized that the connecting member cooperates with the rear wheel house outer to define the third closed cross section.

With this configuration, it is possible to improve body rigidity by using the connecting member.

In the invention according to the sixth aspect, the invention according to a seventh aspect is characterized that the second closed cross section and the third closed cross section partially communicate with each other.

With this configuration, it is possible to increase the section modulus while reducing the weight of the pillar inner member.

In the invention according to any one of the first to seventh aspects, the invention according to an eighth aspect is characterized that the first closed cross section constitutes at least a part of a first ring-shaped structure that continues with the rear door opening edge and is substantially orthogonal to the vehicle width direction, and that the second closed cross section constitutes at least a part of a second ring-shaped structure that continues with a quarter pillar including the pillar outer member and the pillar inner member and with a roof reinforcement extending in the vehicle width direction and that is substantially orthogonal to the body front-rear direction.

With this configuration, it is possible to disperse the opening/closing load of the rear door via the first and second ring-shaped structures.

Advantage of the Invention

With the vehicle side body structure according to the present invention, it is possible to secure vibration suppression performance while suppressing an increase in body weight by the connecting member that connects the pillar outer member and the pillar inner member.

MODES FOR CARRYING OUT THE INVENTION

A description will hereinafter be given for a mode for carrying out the invention with reference to the drawings. The following description of a preferred embodiment is essentially and merely illustrative and thus has no intention to limit the invention, application subjects thereof, and application thereof.

First Embodiment

A description will hereinafter be given for a first embodiment of the present invention with reference to FIG. 1 to FIG. 13.

A vehicle V according to this first embodiment is a front-engine, rear-wheel-drive (FR) automobile that includes an engine (not illustrated) vertically arranged in an engine bay in front of a cabin and is driven by rear wheels.

Hereinafter, a description will be made by setting an arrow F direction as forward in a body front-rear direction, an arrow L direction as leftward in a vehicle width direction, and an arrow U direction as upward in a body vertical direction in the drawings. In addition, this vehicle V has a bilaterally symmetrical structure. Thus, hereinafter, a description will mainly be given for right members and right portions unless otherwise noted.

An overall configuration will be described first.

As illustrated in FIG. 1 to FIG. 4, the vehicle V includes: a right and left pair of side sills 1, each of which extends in the front-rear direction; a floor panel 2 that is hung between these side sills 1 and constitutes a cabin floor surface; a right and left pair of roof side rails 10, each of which extends in the front-rear direction; right and left sets of A to D pillars 21 to 24, each of which extends downward from the roof side rail 10; a right and left pair of rear wheel houses 30, each of which is coupled to a lower end of the C pillar 23; and the like.

The side sill 1 is configured to include an outer member and an inner member, each of which is formed by pressing a steel sheet, and both of the members cooperate with each other to define a substantially straight closed cross section that extends in the front-rear direction.

A lower end of a hinge pillar 21a that corresponds to a lower half portion of the A pillar 21 is connected to a front-end portion of the side sill 1. A lower end of the B pillar 22 is connected to an intermediate portion of the side sill 1.

The A pillar 21, a front portion of the roof side rail 10, the B pillar 22, and a front portion of the side sill 1 form a door opening edge Ef for a front door (not illustrated).

A front-end portion of the rear wheel house 30 is connected to a rear end portion of the side sill 1.

The B pillar 22, a rear portion of the roof side rail 10, the C pillar 23, a front portion of the rear wheel house 30, and a rear portion of the side sill 1 form a door opening edge Er for a rear door (not illustrated).

A kick-up section that is inclined upward to the rear is formed in a rear portion of the floor panel 2.

A crossmember 3 that couples the rear wheel houses 30 is provided on top of the kick-up section. This crossmember 3 has a substantially crank-shaped cross section and cooperates with an upper surface of the floor panel 2 to define a closed cross section that extends in a right-left direction and has a substantially rectangular shape cross section.

The floor panel 2 is formed with a spare tire pan that is recessed downward at a position behind the crossmember 3 and between a pair of rear side frames 4.

As illustrated in FIG. 1 to FIG. 4, the roof side rails 10 are disposed at right and left ends of a roof panel (not illustrated) and include a front and rear pair of headers 11, 12, two roof reinforcements 13, 14, and the like.

The front header 11 couples front ends of the roof side rails 10, and the rear header 12 couples rear ends of the roof side rails 10. A right and left pair of hinges (not illustrated) for opening/closing a lift gate (not illustrated) are mounted on the rear header 12.

The front roof reinforcement 13 is arranged at a position to couple upper ends of the B pillars 22 in the right-left direction. The rear roof reinforcement 14 is arranged at a position to couple upper ends of the C pillars 23 in the right-left direction. Each of these roof reinforcements 13, 14 cooperates with the roof panel to define a closed cross section that extends in the right-left direction.

Next, a description will be given for the C pillar 23.

As illustrated in FIG. 1 to FIG. 4, the C pillar 23, which corresponds to a quarter pillar, is formed to be tilted upward to the front and separates a rear door opening and a quarter window from each other in the front-rear direction.

As illustrated in FIG. 5 to FIG. 10, the C pillar 23 includes: an outer reinforcement 25 (a pillar outer member) that is a pillar outer-side reinforcing member; an inner reinforcement 26 (a pillar inner member) that is a pillar inner-side reinforcing member; a connecting member 27; and the like.

The outer reinforcement 25 is formed of a high-tensile steel sheet having a thickness of 0.9 mm, for example, and is disposed in a manner to extend downward from an intermediate portion of the C pillar 23, more specifically, a position corresponding to a lower end of the quarter window to an outer overhang 33, which will be described later.

As illustrated in FIG. 5 to FIG. 7 and FIG. 10, the outer reinforcement 25 includes: a side surface 25a that is substantially orthogonal to the right-left direction; a front wall 25b that extends leftward from a front end of the side surface 25a; a rear wall 25c that extends leftward from a rear end of the side surface 25a; and the like, and is formed to have a substantially hat-shaped cross section.

In this outer reinforcement 25, both flanges 25f that are formed at left ends of the front wall 25b and the rear wall 25c are joined to a right surface (an outer surface in the vehicle width direction) of a side panel 5 by welding. The outer reinforcement 25 cooperates with the side panel 5 to define a first closed cross section C1 that extends in a vertical direction.

The first closed cross section C1 is configured to continue with the door opening edge Er and partially follows a rear end portion of the door opening edge Er.

As illustrated in FIG. 1, FIG. 2, FIG. 5, and FIG. 6, a lower end of the outer reinforcement 25 is joined to an upper surface of the outer overhang 33 by welding.

A striker 28 (see FIG. 10), with which a latch mechanism (not illustrated) provided on the rear door can be engaged, is attached to the outer reinforcement 25.

As illustrated in FIG. 5 to FIG. 10, an attachment plate 29 that fixes the striker 28 is fixed to a rear surface of the front wall 25b. A fixture section that is formed in an intermediate portion of the attachment plate 29 is joined to a welding position P1 set in the front wall 25b by welding.

The inner reinforcement 26 is formed of a cold-rolled steel sheet having a thickness of 1.2 mm, for example, and is disposed in a manner to extend downward from the intermediate portion of the C pillar 23 to a brace 41 of a suspension housing 40.

As illustrated in FIG. 6 to FIG. 8 and FIG. 10, the inner reinforcement 26 includes: a side surface 26a that is substantially orthogonal to the right-left direction; a front wall 26b that extends rightward from a front end of the side surface 26a; a rear wall 26c that extends rightward from a rear end of the side surface 26a; and the like, and is formed to have a substantially hat-shaped cross section.

In this inner reinforcement 26, both flanges 26f that are formed at right ends of the front wall 26b and the rear wall 26c are joined to a left surface (an inner surface in the vehicle width direction) of the side panel 5 by welding. The inner reinforcement 26 cooperates with the side panel 5 to define a second closed cross section C2 that extends in the vertical direction.

The second closed cross section C2 is configured to continue with the rear roof reinforcement 14 via an upper half portion of the C pillar 23 and partially follows the rear end portion of the door opening edge Er.

Figure 1:
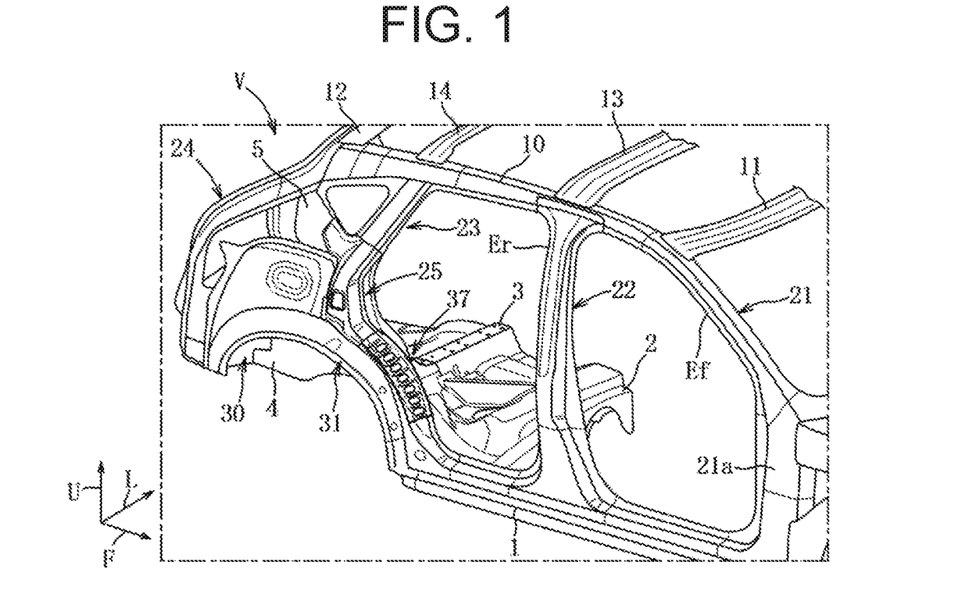
FIG. 1 is a perspective view of an outer side in a vehicle width direction of a vehicle according to a first embodiment.
Figure 2:
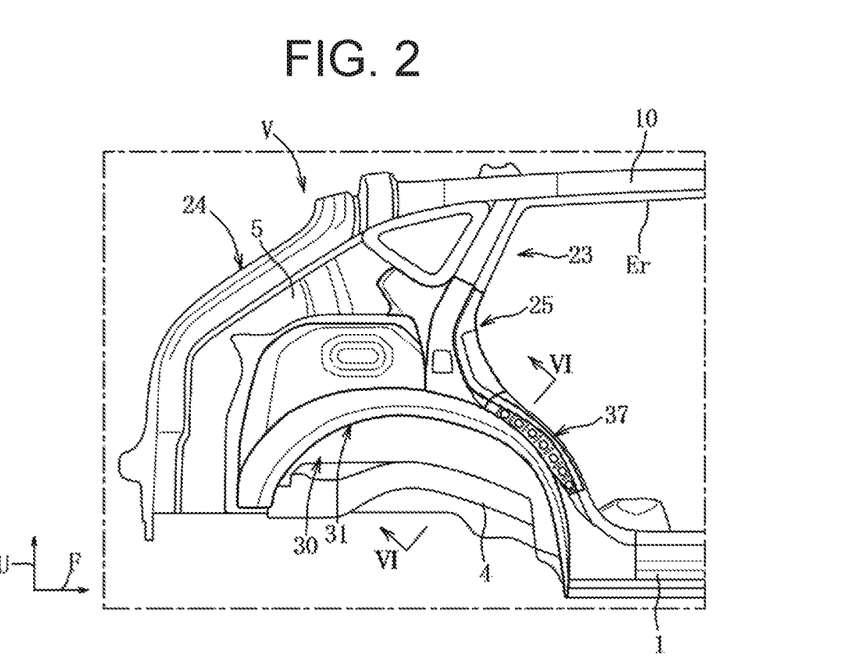
FIG. 2 is a side view of a rear portion on the outer side in the vehicle width direction.
Figure 3:
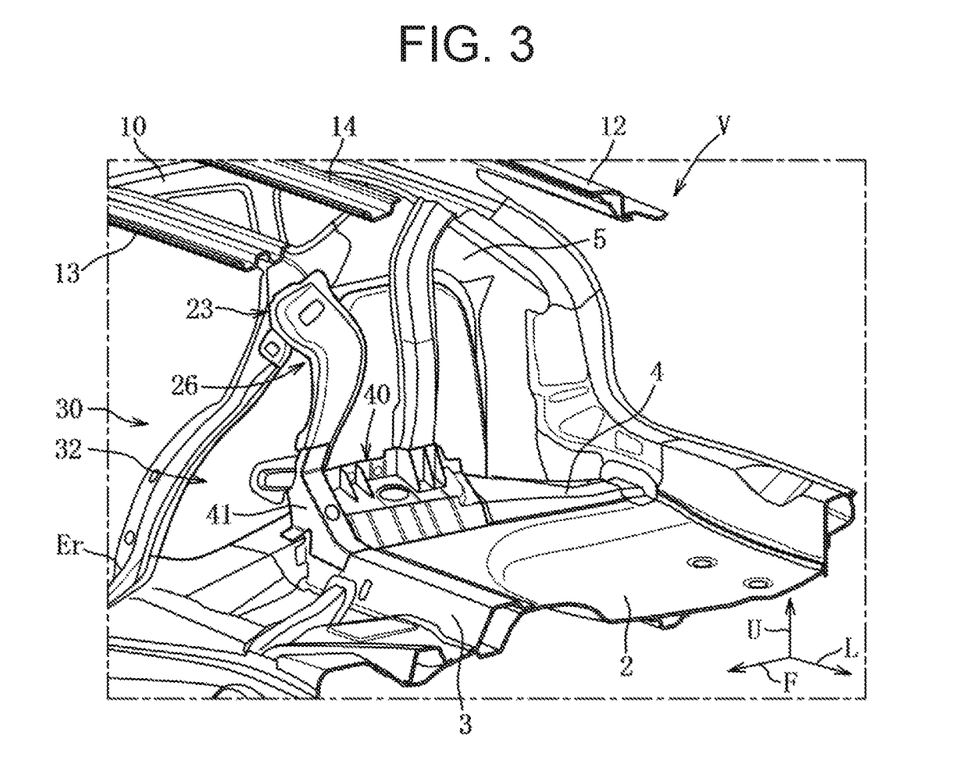
FIG. 3 is a perspective view of an inner side in the vehicle width direction.
Figure 4:
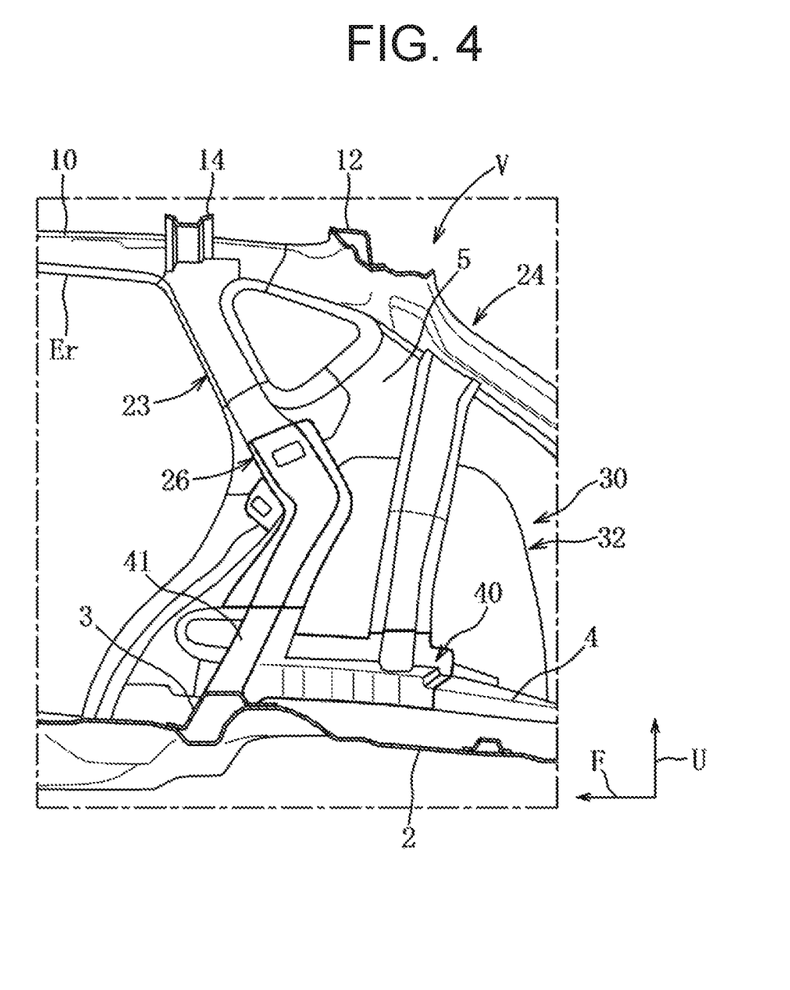
FIG. 4 is a side view of a rear portion on the inner side in the vehicle width direction.
Figure 6:
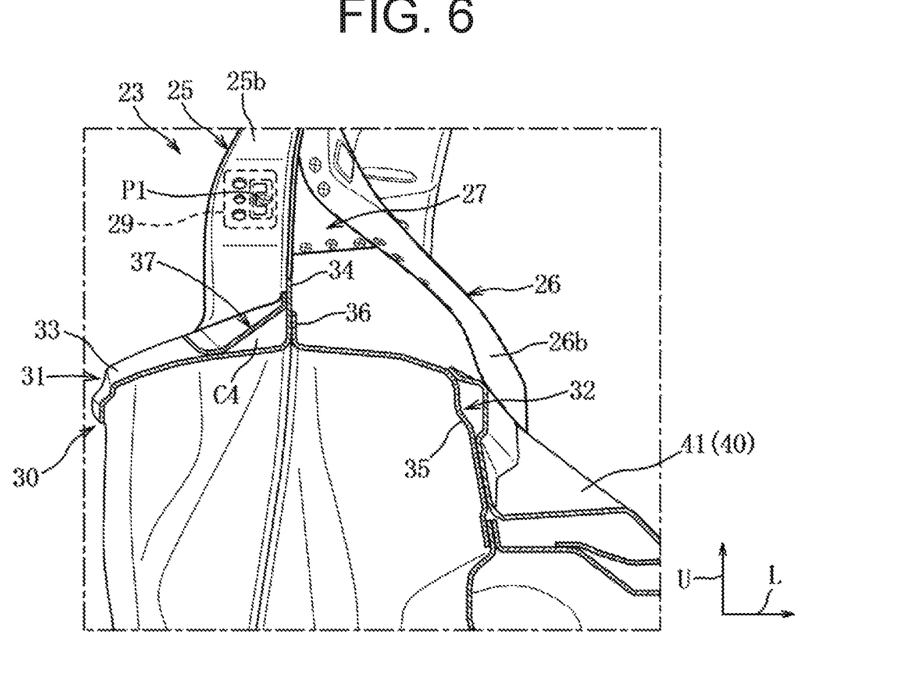
FIG. 6 is a cross-sectional view that is taken along line VI-VI in FIG. 2.
Figure 7:
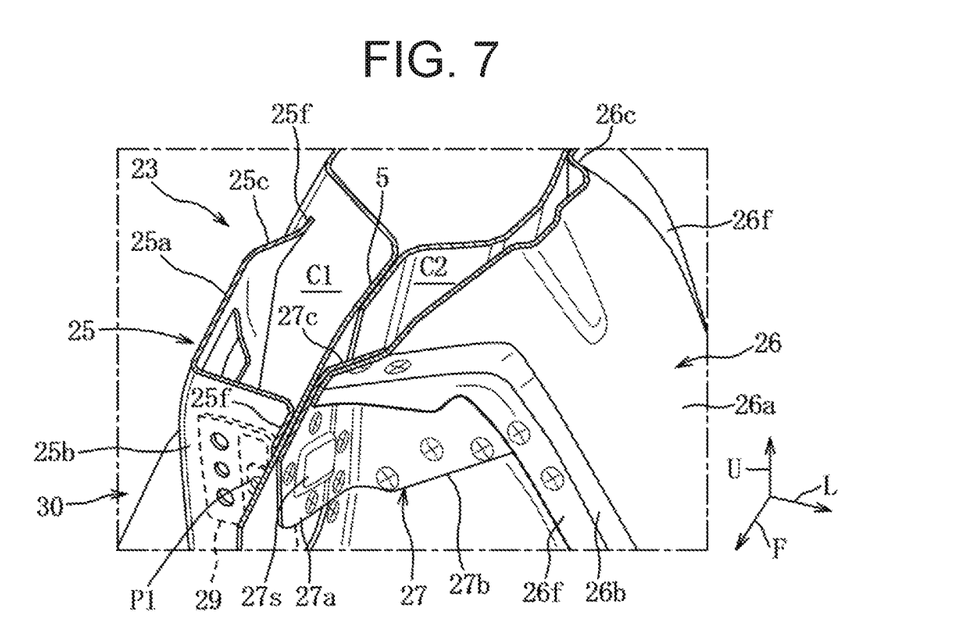
FIG. 7 is a cross-sectional view that is taken along line VII-VII in FIG. 5.

As illustrated in FIG. 3, FIG. 4, and FIG. 6, a lower end of the inner reinforcement 26 is joined to an upper end portion of the brace 41 by welding.

Here, a description will be given for the suspension housing 40.

As illustrated in FIG. 3, the suspension housing 40 is configured to connect a damper support section (not illustrated) of a rear suspension to the rear side frame 4.

This suspension housing 40 is a member that is made of an aluminum alloy and shaped by die-casting, for example, and includes the brace 41 as a reinforcing section.

The brace 41 is arranged to be substantially orthogonal to the front-rear direction and is integrally formed in a front end portion of the suspension housing 40.

This brace 41 has a substantially hat-shaped cross section and cooperates with a left surface of a wheel house inner 32, which will be described later, to define a closed cross section that extends in the vertical direction and has a substantially rectangular shape cross section.

A lower end of this brace 41 is joined to a right end of the crossmember 3 by welding.

Figure 11:
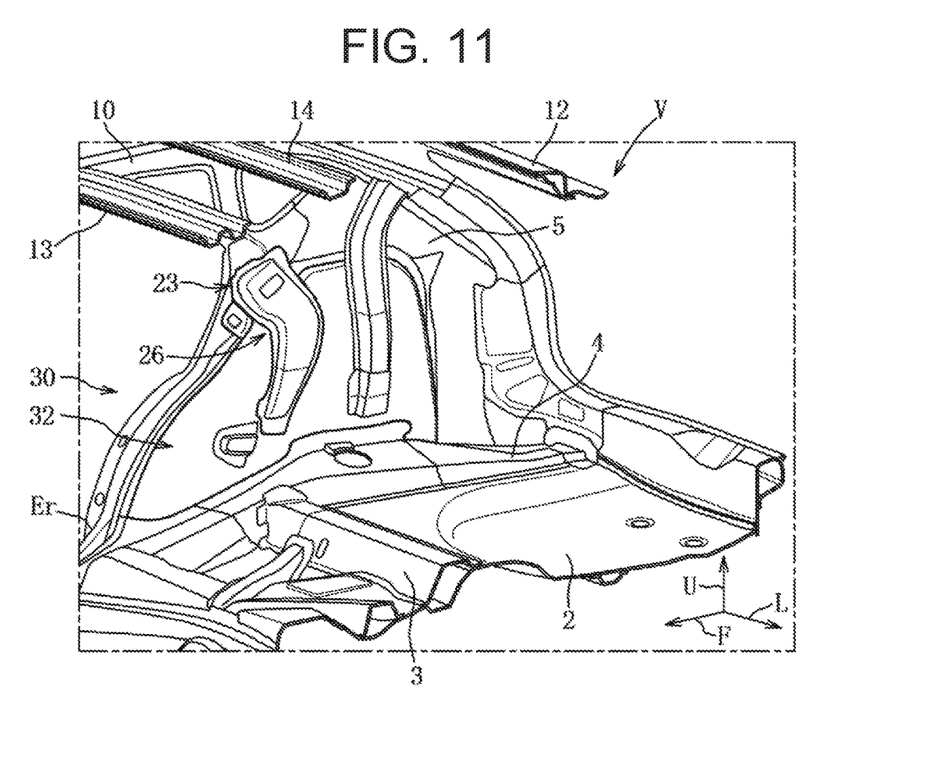
FIG. 11 is a view in which a suspension housing in FIG. 3 is not illustrated.

As illustrated in FIG. 11, the lower end of the inner reinforcement 26 and the right end of the crossmember 3 separate from each other in the vertical direction. However, since both of the members are coupled to each other via the brace 41, the second closed cross section C2 defined by the inner reinforcement 26 and the closed cross section defined by the crossmember 3 are connected to each other via the closed cross section defined by the brace 41.

Next, a description will be given for the connecting member 27.

As illustrated in FIG. 6 to FIG. 10, the connecting member 27 is formed of a cold-rolled steel sheet having a thickness of 1.2 mm, for example, and is arranged at a position adjacent to a left side of the attachment plate 29.

The connecting member 27 includes: a side wall 27a that is substantially orthogonal to the right-left direction; a horizontal wall 27b that is substantially orthogonal to the vertical direction; and a vertical wall 27c that is substantially orthogonal to the front-rear direction.

A projection 27s that is projected leftward is partially formed in an intermediate area of the side wall 27a.

In this way, the side wall 27a cooperates with a left surface of a wheel house outer 31, which will be described later, to define a third closed cross section C3.

The side wall 27a is joined to the front flange 25f of the outer reinforcement 25 and the wheel house outer 31 at two welding positions P2, is joined to the wheel house outer 31 and the wheel house inner 32 at two welding positions P3, is joined to the wheel house outer 31 at a welding position P4, and is joined to the wheel house outer 31 and the front flange 26f of the inner reinforcement 26 at a welding position P5.

The two welding positions P2 of the side wall 27a are set at a substantially same height as a height position of the welding position P1 of the attachment plate 29.

Figure 8:
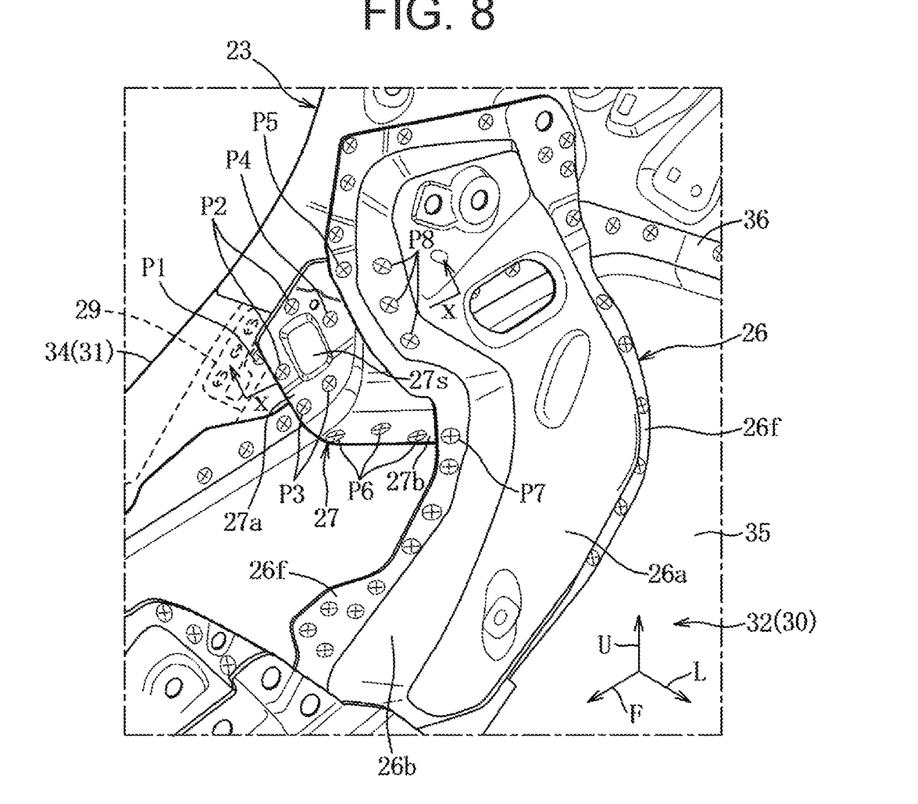
FIG. 8 is an enlarged view of a main section in FIG. 3.
Figure 9:
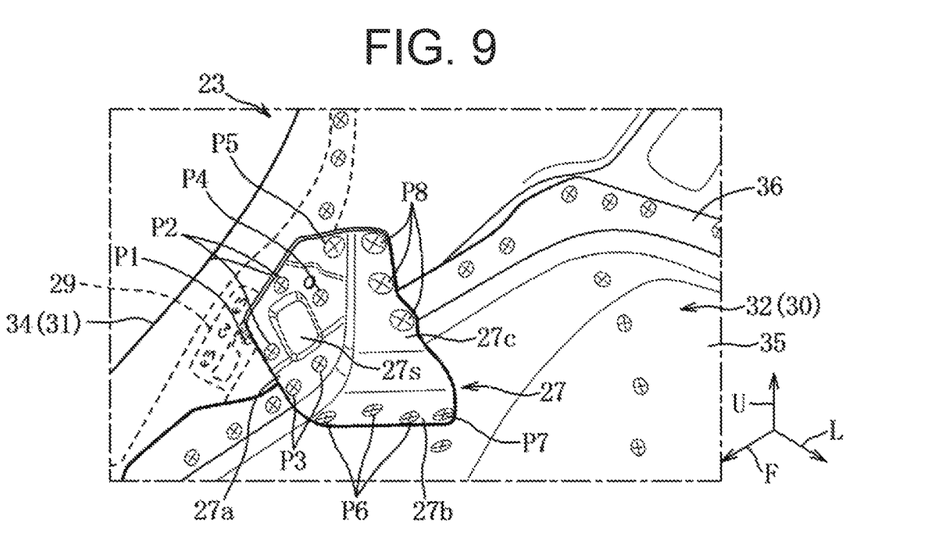
FIG. 9 is an enlarged view in which an inner reinforcement in FIG. 8 is not illustrated.

As illustrated in FIG. 8 and FIG. 9, the horizontal wall 27b is joined to the wheel house inner 32 at three welding positions P6, and is joined to the wheel house inner 32 and the front flange 26f of the inner reinforcement 26 at a welding position P7.

The vertical wall 27c is joined to the front wall 26b of the inner reinforcement 26 at three welding positions P8.

Next, a description will be given for the rear wheel house 30.

As illustrated in FIG. 1 to FIG. 4, the rear wheel house 30 includes: the wheel house outer 31 that is bulged rightward (outward in the vehicle width direction) from the side panel 5; and the wheel house inner 32 that is bulged leftward (inward in the vehicle width direction) from the side panel 5.

Figure 5:
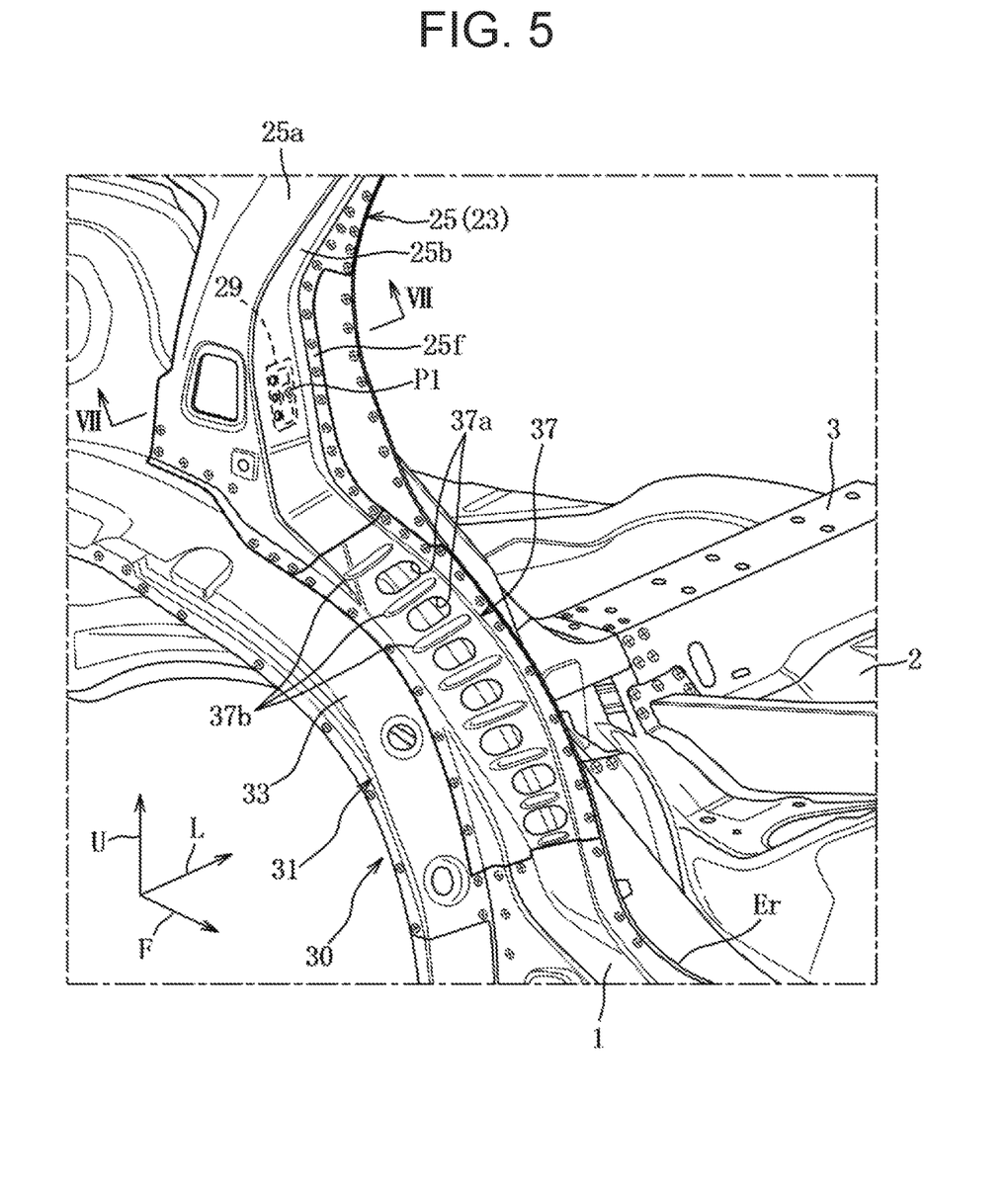
FIG. 5 is an enlarged view of a main section in FIG. 1.

As illustrated in FIG. 5 and FIG. 6, the wheel house outer 31 is formed of a cold-rolled steel sheet having a thickness of 0.6 mm, for example, and includes: the outer overhang 33 in a substantially semicircular shape when seen in a side view; and an outer flange 34 that extends upward from a left end of this outer overhang 33 and has a vertical wall shape.

A front portion of the outer flange 34 is formed along a rear portion of the door opening edge Er.

A rear portion of the outer flange 34 is integrally constructed with a lower half portion of the side panel 5, and is joined to a lower end of an upper half portion of the side panel 5 by welding.

Figure 10:
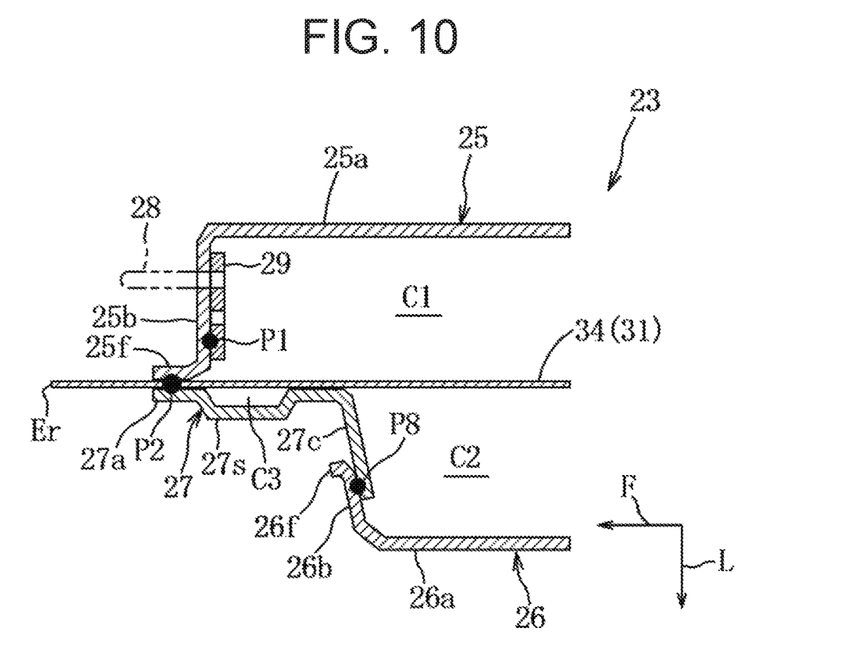
FIG. 10 is a cross-sectional view that is taken along line X-X in FIG. 8.

Accordingly, as illustrated in FIG. 8 to FIG. 10, the outer flange 34 is joined at the welding positions P2 in a state of being held between the front flange 25f and the side wall 27a, and is joined to the side wall 27a at the welding position P4. In addition, the outer flange 34 and the side wall 27a hold an inner flange 36 therebetween at the welding positions P3, and the outer flange 34 and the front flange 26f hold the side wall 27a therebetween at the welding position P5.

As illustrated in FIG. 6, FIG. 8, and FIG. 9, the wheel house inner 32 is formed of a cold-rolled steel sheet having a thickness of 0.65 mm, for example, and includes: an inner overhang 35 in a substantially half-bowl shape when seen in the side view; and the inner flange 36 that extends upward from a right end of this inner overhang 35 and has a substantially arcuate shape.

In a state where the right end of the inner overhang 35 substantially matches the left end of this outer overhang 33, a right surface of the inner flange 36 is joined to a left surface of the outer flange 34 in a surface contact state by welding.

As illustrated in FIG. 1, FIG. 2, FIG. 5, and FIG. 6, a reinforcing member 37 that follows a curved shape of the wheel house outer 31 (the rear portion of the door opening edge Er) is disposed in a front portion of the wheel house outer 31.

The reinforcing member 37 is formed of a high-tensile steel sheet having a thickness of 0.8 mm, for example, and cooperates with the outer overhang 33 and the outer flange 34 to define a fourth closed cross section C4 that is a triangular cross section.

An upper portion of the reinforcing member 37 is joined to the front portion of the outer flange 34, and a lower portion of the reinforcing member 37 is joined to a front portion of the outer overhang 33. Furthermore, the front portion of the reinforcing member 37 is joined to a rear end upper portion of the side sill 1 by welding, and the rear portion of the reinforcing member 37 is joined to a lower end front portion of the outer reinforcement 25 by welding. After the fourth closed cross section C4 defined by the reinforcing member 37 is defined, the outer flange 34 and the inner flange 36 are joined to each other via an opening 37a.

As illustrated in FIG. 5, the reinforcing member 37 includes a plurality of, for example, seven openings 37a and a plurality of, for example, eight (8) beads 37b.

The opening 37a in a substantially oval shape is formed to communicate between inside and outside of the fourth closed cross section C4.

When the outer flange 34 and the inner flange 36 are welded, a welding electrode is inserted through the fourth closed cross section C4 via the opening 37a.

Each of the beads 37b is configured to be recessed in the fourth closed cross section C4. The beads 37b are formed at positions where the beads 37b are substantially orthogonal to (arranged radially with respect to) the outer overhang 33 when seen in the side view.

Each of these beads 37b are disposed between the adjacent openings 37a. In other words, the adjacent beads 37b are disposed in a manner to hold the opening 37a therebetween.

Figure 12:
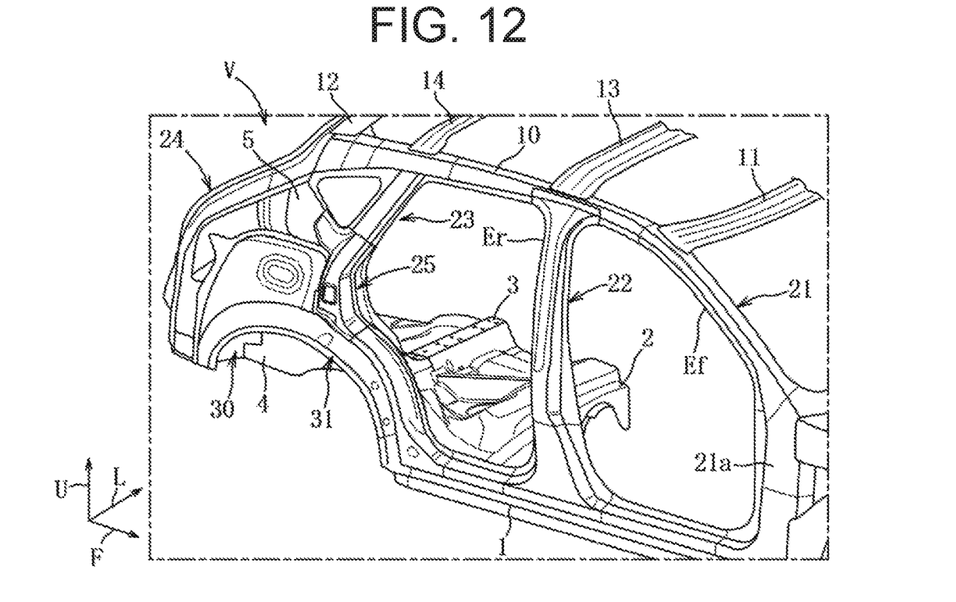
FIG. 12 is a view in which a reinforcing member in FIG. 1 is not illustrated.

As illustrated in FIG. 12, the lower end of the outer reinforcement 25 and a rear end of the side sill 1 separate from each other. However, since both of the members are coupled to each other via the reinforcing member 37, the first closed cross section C1 defined by the outer reinforcement 25 and the closed cross section defined by the side sill 1 are connected to each other via the fourth closed cross section C4 defined by the reinforcing member 37.

Like the description so far, the vehicle V has a right and left pair of first ring-shaped structures S1 and a second ring-shaped structure S2 that couples rear portions of the first ring-shaped structures S1.

Figure 13:
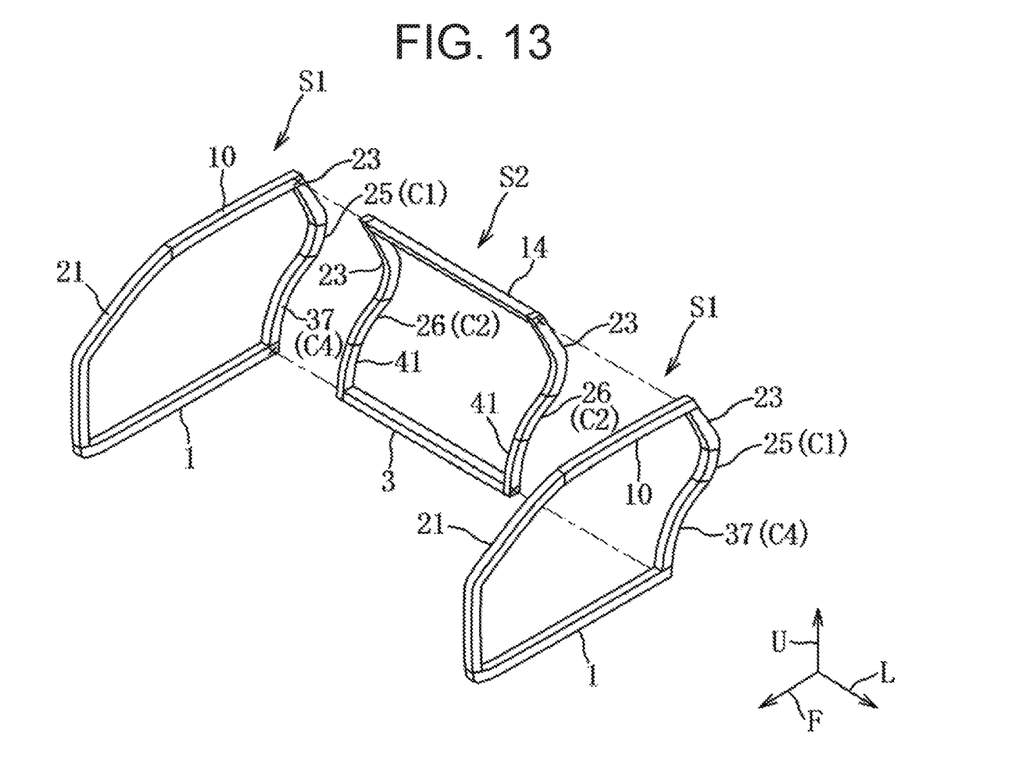
FIG. 13 is an explanatory view of a first ring-shaped structure and a second ring-shaped structure.

As illustrated in FIG. 13, each of the first ring-shaped structures S1 constitutes a door opening that is arranged in a manner to be substantially orthogonal to the right-left direction.

The first ring-shaped structure S1 is configured to include the closed cross section defined by the side sill 1, the closed cross section defined by the A pillar 21, the closed cross section defined by the roof side rail 10, the closed cross section defined by the C pillar 23, the first closed cross section C1 defined by the outer reinforcement 25, and the fourth closed cross section C4 defined by the reinforcing member 37.

The second ring-shaped structure S2 is arranged in a manner to be substantially orthogonal to the front-rear direction.

The second ring-shaped structure S2 is configured to include the closed cross section defined by the right and left pair of the C pillars 23, the second closed cross section C2 defined by the right and left pair of the inner reinforcements 26, the closed cross section defined by the right and left pair of the braces 41, the closed cross section defined by the crossmember 3, and the closed cross section defined by the rear roof reinforcement 14.

In this way, a load that is received by the suspension housing 40 is transferred by the first and second ring-shaped structures S1, S2 as load paths and is dispersed to each frame member.

Meanwhile, an opening/closing load of the rear door is transferred from the striker 28 (the attachment plate 29) to the roof side rail 10 via the outer reinforcement 25, is also transferred to the inner reinforcement 26 via the connecting member 27, and is dispersed to the second ring-shaped structure S2 side.

Next, a description will be given for action and effects of the side body structure described above.

In the side body structure according to the first embodiment, the striker 28 is fixed to the outer reinforcement 25. Thus, a dedicated striker fixing member can be omitted.

Since the connecting member 27, which connects the front flange 25f of the outer reinforcement 25 and each of the front wall 26b and the front flange 26f of the inner reinforcement 26, is provided, the opening/closing load of the rear door received via the striker 28 can be dispersed to a body frame member via the outer reinforcement 25 and the inner reinforcement 26 as the two load paths.

Since the connecting member 27 is connected to each of the outer reinforcement 25, the inner reinforcement 26, the rear wheel house outer 31, and the rear wheel house inner 32, it is possible to strengthen support rigidity of the connecting member 27.

Since the connecting member 27 includes: the side wall 27a that is substantially orthogonal to the vehicle width direction; the horizontal wall 27b that is substantially orthogonal to the vertical direction; and the vertical wall 27c that is substantially orthogonal to the front-rear direction, it is possible to improve dispersion efficiency of the opening/closing load of the rear door by using the single connecting member 27.

Since the connecting member 27 is arranged at the position adjacent to the striker 28, it is possible to increase the opening/closing load of the rear door that is transferred to the inner reinforcement 26.

Since the welding position P1 of the fixture section, which fixes the striker 28 to the outer reinforcement 25, is set at the substantially same height as the height position of the welding position P2 for the connecting member 27 and the wheel house outer 31, it is possible to minimize the size of the connecting member 27, and thus reduce the weight thereof.

Since the connecting member 27 cooperates with the wheel house outer 31 to define the third closed cross section C3, it is possible to improve body rigidity by using the connecting member 27.

The first closed cross section C1 constitutes at least a part of the first ring-shaped structure S1 that continues with the rear door opening edge Er and is substantially orthogonal to the right-left direction. The second closed cross section C2 constitutes at least a part of the second ring-shaped structure S2 that continues with the quarter pillar including the outer reinforcement 25 and the inner reinforcement 26 and the rear roof reinforcement 14 extending in the right-left direction and is substantially orthogonal to the front-rear direction. In this way, it is possible to disperse the opening/closing load of the rear door via the first and second ring-shaped structures S1, S2.

Next, a description will be given for a modified embodiment in which the embodiment described above is partially modified.

(1) In the first embodiment, the description has been given for the example of the FR vehicle of a hatchback type that includes the vertically-installed engine. However, the present invention may be adopted for an FF vehicle of a sedan type that includes a laterally-installed engine. The present invention can be adopted for any type of vehicles regardless of a drive type, a body type, and the like.

(2) In the first embodiment, the description has been given for the example in which the second closed cross section defined by the inner reinforcement and a third closed cross section defined by the connecting member are independently configured. However, the second closed cross section and the third closed cross section may be configured to partially communicate with each other. In this way, it is possible to increase a section modulus of the second closed cross section defined by the inner reinforcement while reducing weight of the inner reinforcement.

(3) In the first embodiment, the description has been given for the example in which the lower half portion of the side panel is integrally formed with the outer flange of the wheel house outer. However, the lower half portion of the side panel may integrally be formed with the inner flange. In addition, it is also possible to constitute the lower half portion of the side panel by a member other than the rear wheel house.

(4) In the first embodiment, the description has been given for the example of the connecting member that includes the side wall, the horizontal wall, and the vertical wall. However, at least the connecting member only needs to couple the outer reinforcement and the inner reinforcement, and one of the horizontal wall and the vertical wall may not be provided.

(5) In addition to the above, those skilled in the art can implement a mode, in which various modifications are added to the embodiment, or a mode, in which the embodiments are combined, without departing from the gist of the present invention, and the present invention includes such modified modes.

DESCRIPTION OF REFERENCE CHARACTERS

14: Rear roof reinforcement
23: C pillar
25: Outer reinforcement
26: Inner reinforcement
27: Connecting member
28: Striker (for rear door)
30: Rear wheel house
31: Wheel house outer
32: Wheel house inner
S1: First ring-shaped structure
S2: Second ring-shaped structure
C1: First closed cross section
C2: Second closed cross section
C3: Third closed cross section
V: Vehicle

The invention claimed is:

1. A vehicle side body structure comprising:
a rear wheel house configured to include a rear wheel house outer and a rear wheel house inner;
a pillar outer member cooperating with the rear wheel house outer to define a first closed cross section that extends in a vertical direction and is provided along a part of a rear door opening edge; and a pillar inner member cooperating with the rear wheel house inner to define a second closed cross section that extends in a body vertical direction, wherein a connecting member is provided to connect an inner portion in a vehicle width direction of the pillar outer member and an outer portion in the vehicle width direction of the pillar inner member; and the pillar outer member is fixed to a rear door striker.

2. The vehicle side body structure according to claim 1, wherein the connecting member is connected to each of the pillar outer member, the pillar inner member provided along the part of the rear door opening edge, the rear wheel house outer, and the rear wheel house inner.

3. The vehicle side body structure according to claim 1, wherein the connecting member includes:

a side wall that is substantially orthogonal to the vehicle width direction;

a horizontal wall that is substantially orthogonal to the body vertical direction; and a vertical wall that is substantially orthogonal to a body front-rear direction.

4. The vehicle side body structure according to claim 2, wherein the connecting member includes:

a side wall that is substantially orthogonal to the vehicle width direction;

a horizontal wall that is substantially orthogonal to the body vertical direction; and a vertical wall that is substantially orthogonal to a body front-rear direction.

5. The vehicle side body structure according to claim 1, wherein the connecting member is arranged at a position adjacent to the rear door striker.

6. The vehicle side body structure according to claim 2, wherein the connecting member is arranged at a position adjacent to the rear door striker.

7. The vehicle side body structure according to claim 3, wherein the connecting member is arranged at a position adjacent to the rear door striker.

8. The vehicle side body structure according to claim 4, wherein the connecting member is arranged at a position adjacent to the rear door striker.

9. The vehicle side body structure according to claim 5, wherein a height position of a fixture section that fixes the rear door striker to the pillar outer member is set at substantially the same height as a height position of a joint section for the connecting member and the rear wheel house outer.

10. The vehicle side body structure according to claim 6, wherein a height position of a fixture section that fixes the rear door striker to the pillar outer member is set at substantially the same height as a height position of a joint section for the connecting member and the rear wheel house outer.

11. The vehicle side body structure according to claim 7, wherein a height position of a fixture section that fixes the rear door striker to the pillar outer member is set at substantially the same height as a height position of a joint section for the connecting member and the rear wheel house outer.

12. The vehicle side body structure according to claim 8, wherein a height position of a fixture section that fixes the rear door striker to the pillar outer member is set at substantially the same height as a height position of a joint section for the connecting member and the rear wheel house outer.

13. The vehicle side body structure according to claim 1, wherein the connecting member cooperates with the rear wheel house outer to define a third closed cross section.

14. The vehicle side body structure according to claim 12, wherein the connecting member cooperates with the rear wheel house outer to define a third closed cross section.

15. The vehicle side body structure according to claim 1, wherein the first closed cross section constitutes at least a part of a first ring-shaped structure that continues with the rear door opening edge and is substantially orthogonal to the vehicle width direction, and the second closed cross section constitutes at least a part of a second ring-shaped structure that continues with a quarter pillar including the pillar outer member and the pillar inner member and with a roof reinforcement extending in the vehicle width direction and that is substantially orthogonal to the body front-rear direction.

16. The vehicle side body structure according to claim 4, wherein the first closed cross section constitutes at least a part of a first ring-shaped structure that continues with the rear door opening edge and is substantially orthogonal to the vehicle width direction, and the second closed cross section constitutes at least a part of a second ring-shaped structure that continues with a quarter pillar including the pillar outer member and the pillar inner member and with a roof reinforcement extending in the vehicle width direction and that is substantially orthogonal to the body front-rear direction.

17. The vehicle side body structure according to claim 8, wherein the first closed cross section constitutes at least a part of a first ring-shaped structure that continues with the rear door opening edge and is substantially orthogonal to the vehicle width direction, and the second closed cross section constitutes at least a part of a second ring-shaped structure that continues with a quarter pillar including the pillar outer member and the pillar inner member and with a roof reinforcement extending in the vehicle width direction and that is substantially orthogonal to the body front-rear direction.

18. The vehicle side body structure according to claim 14, wherein the first closed cross section constitutes at least a part of a first ring-shaped structure that continues with the rear door opening edge and is substantially orthogonal to the vehicle width direction, and the second closed cross section constitutes at least a part of a second ring-shaped structure that continues with a quarter pillar including the pillar outer member and the pillar inner member and with a roof reinforcement extending in the vehicle width direction and that is substantially orthogonal to the body front-rear direction.

\* \* \* \* \*